United States Patent
Ishigure et al.

(10) Patent No.: US 10,014,138 B2
(45) Date of Patent: Jul. 3, 2018

(54) SWITCH DEVICE

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Nobuyuki Ishigure, Aichi (JP); Yoshio Chiba, Aichi (JP); Akio Nishiyama, Aichi (JP); Yasuaki Nadaya, Aichi-ken (JP); Toshihiko Kosugi, Aichi-ken (JP); Shigeo Shigeyama, Aichi-ken (JP); Tadashi Okubo, Aichi-ken (JP)

(73) Assignees: KABUSHIKI KAISHA TOKAI RIKA DENKI SEISAKUSHO, Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/051,245

(22) Filed: Feb. 23, 2016

(65) Prior Publication Data
US 2016/0247646 A1 Aug. 25, 2016

(30) Foreign Application Priority Data

Feb. 25, 2015 (JP) ................. 2015-035198

(51) Int. Cl.
  *H01H 25/04* (2006.01)
  *B60Q 1/14* (2006.01)
  *G01M 11/06* (2006.01)

(52) U.S. Cl.
  CPC .......... *H01H 25/04* (2013.01); *B60Q 1/1469* (2013.01); *G01M 11/068* (2013.01); *H01H 2207/04* (2013.01)

(58) Field of Classification Search
  CPC ... H01H 25/04; H01H 2207/04; B60Q 1/1469
  (Continued)

(56) References Cited

U.S. PATENT DOCUMENTS

| | | |
|---|---|---|
| 6,441,327 B1 | 8/2002 | Shibata et al. |
| 2004/0074746 A1* | 4/2004 | Ficek ................... B60Q 1/1476 200/61 |

(Continued)

FOREIGN PATENT DOCUMENTS

| | | |
|---|---|---|
| EP | 1090807 A2 | 4/2001 |
| EP | 1398212 A2 | 3/2004 |

(Continued)

OTHER PUBLICATIONS

Extended European Search Report for corresponding European Patent Application No. 16156821.7 dated Jun. 24, 2016.
Office Action issued in the corresponding Japanese Application No. H01-066718 dated Feb. 7, 2017.
Chinese Patent Application No. 201610099907.7 Office Action, dated Jul. 3, 2017 and English translation thereof.

(Continued)

*Primary Examiner* — Renee Luebke
*Assistant Examiner* — Iman Malakooti
(74) *Attorney, Agent, or Firm* — Roberts Mlotkowski Safran Cole & Calderon P.C.

(57) ABSTRACT

A switch device includes a cylindrical movable lever-portion that is operable in multiple directions, a unit case that supports the movable lever-portion, and a flexible printed circuit board routed from an inside of the movable lever-portion to an inside of the unit case. A routed portion of the flexible printed circuit board to be routed inside the unit case includes a stress absorber configured to absorb a stress applied to the flexible printed circuit board. The stress absorber includes a plurality of curved portions curved in opposite directions to each other.

5 Claims, 4 Drawing Sheets

(58) Field of Classification Search
USPC .......................................................... 200/293
See application file for complete search history.

(56) References Cited

U.S. PATENT DOCUMENTS

2005/0237725 A1    10/2005   Cho et al.
2014/0124257 A1*    5/2014   Yoshihara .............. H05K 1/023
                                                        174/350

FOREIGN PATENT DOCUMENTS

| EP | 1589794 A1 | 10/2005 | | |
|---|---|---|---|---|
| JP | 62-199057 A | 9/1987 | | |
| JP | 1-66718 U | 4/1989 | | |
| JP | 2001-110281 A | 4/2001 | | |
| JP | 2003045287 A | 2/2003 | | |
| JP | 2005-149930 A | 6/2005 | | |
| JP | 2005149930 | * | 6/2005 | ............. H01H 11/00 |
| JP | 2005-311376 A | 11/2005 | | |
| JP | 2012-231018 A | 11/2012 | | |

OTHER PUBLICATIONS

Office Action issued in the corresponding Japanese Application No. 2015-035198 dated Sep. 5, 2017.
Office Action issued in the corresponding Chinese Application No. 2015-035198 dated Sep. 5, 2017.
Office Action issued in the corresponding Chinese Application No. 201610099907.7 dated Feb. 11, 2018.

* cited by examiner

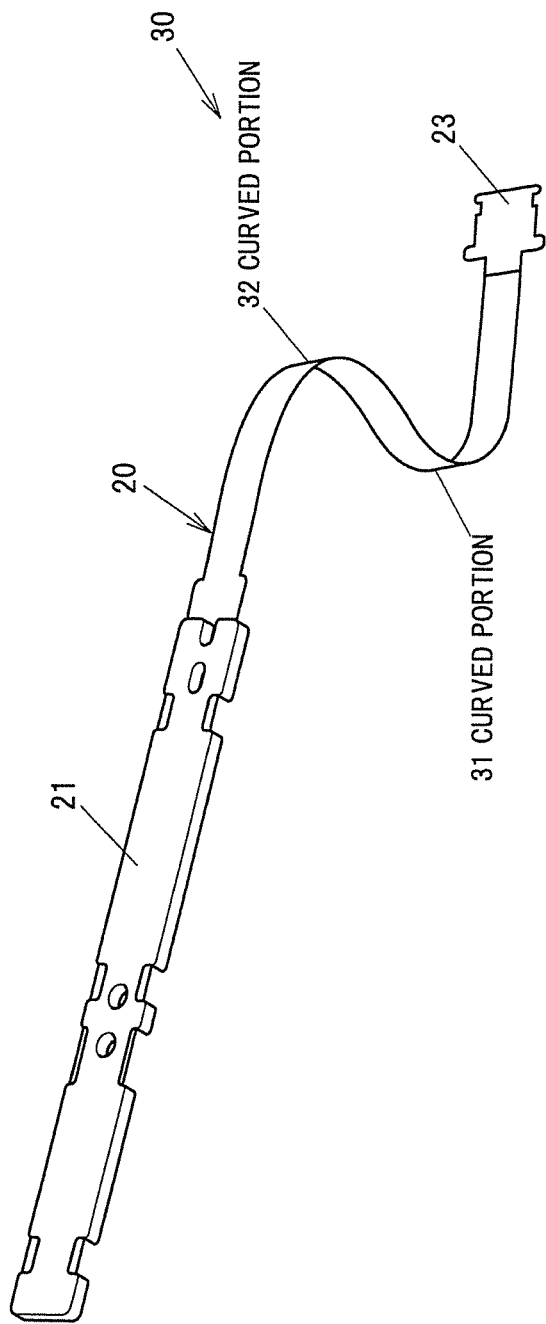

US 10,014,138 B2

SWITCH DEVICE

The present application is based on Japanese patent application No. 2015-035198 filed on Feb. 25, 2015, the entire contents of which are incorporated herein by reference.

BACKGROUND OF THE INVENTION

1. Field of the Invention

The invention relates to a switch device and, in particular, to a switch device provided with an operating lever.

2. Description of the Related Art

One example of switch device provided with an operating lever is an onboard switch device provided with an operating lever which is composed of a long cylindrical case and plural rotating knobs coaxially arranged thereon to operate headlamps or fog lamps of vehicle and is arranged on a side of a steering column so as to be swingable (see e.g. JP-A-2003-45287).

The onboard switch device disclosed in JP-A-2003-45287 has a flexible printed circuit board inside the operating lever. The switch is composed of moving contacts provided inside the rotating knobs and fixed contacts formed on the flexible printed circuit board and is turned on/off by rotating the rotating knobs.

SUMMARY OF THE INVENTION

The onboard switch device is typically constructed such that the flexible printed circuit board is routed from a moving contact of the rotating knob to a connector which is connected to an external wiring on the steering column. If the operating lever is multi-directionally swung back and forth and up and down, torsional stress may act on the flexible printed circuit board.

The flexible printed circuit board repeatedly receiving the torsional stress cracks or is broken or so, which causes a decrease in durability of the flexible printed circuit board. Thus, it is necessary to ensure durability of the flexible printed circuit board so as to withstand long-term use.

It is an object of the invention to provide a switch device that has the flexible printed circuit board improved in durability.

(1) According to embodiment of the invention, a switch device comprises:

a cylindrical movable lever-portion that is operable in multiple directions;

a unit case that supports the movable lever-portion; and a flexible printed circuit board routed from an inside of the movable lever-portion to an inside of the unit case, wherein a routed portion of the flexible printed circuit board to be routed inside the unit case comprises a stress absorber configured to absorb a stress applied to the flexible printed circuit board, and wherein the stress absorber comprises a plurality of curved portions curved in opposite directions to each other.

In the above embodiment (1) of the invention, the following modifications and changes can be made.

(i) The curved portions comprise a part folded into a substantially S-shape.

(ii) The flexible printed circuit board comprises a flexible insulating film and a wiring pattern formed on the insulating film.

(iii) The flexible printed circuit board further comprises a rigid board attached thereto at one end thereof on a side of the movable lever-portion.

Effects Of The Invention

According to an embodiment of the invention, a switch device can be provided that has the flexible printed circuit board improved in durability.

BRIEF DESCRIPTION OF THE DRAWINGS

Next, the present invention will be explained in more detail in conjunction with appended drawings, wherein:

FIG. 3 is a schematic perspective view showing a flexible printed circuit board used in the switch device in the embodiment;

DETAILED DESCRIPTION OF THE PREFERRED EMBODIMENTS

A preferred embodiment of the invention will be specifically described below in conjunction with the appended drawings.

General Configuration of Switch Device

Figure 1:
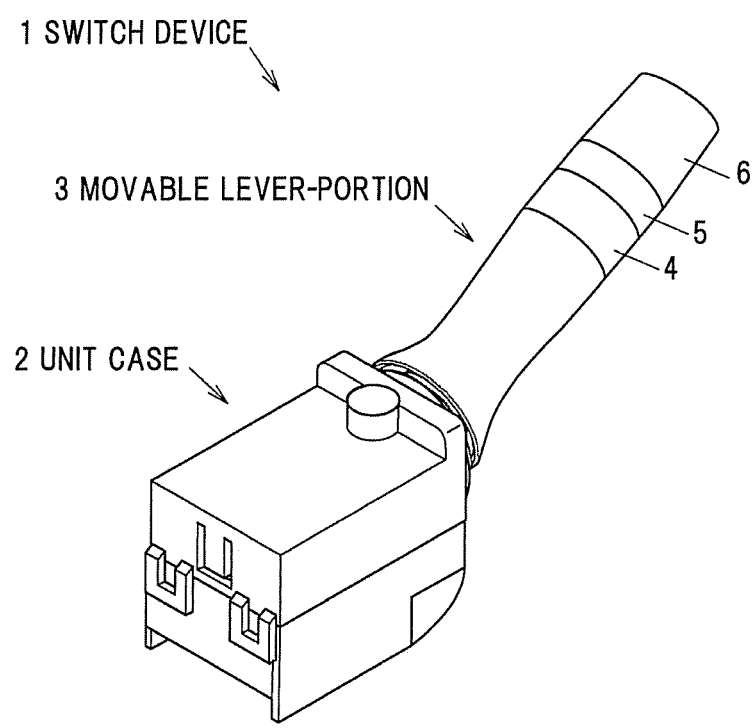
FIG. 1 is a schematic perspective view showing an outer appearance of a switch device in a preferred embodiment of the present invention.
Figure 2:
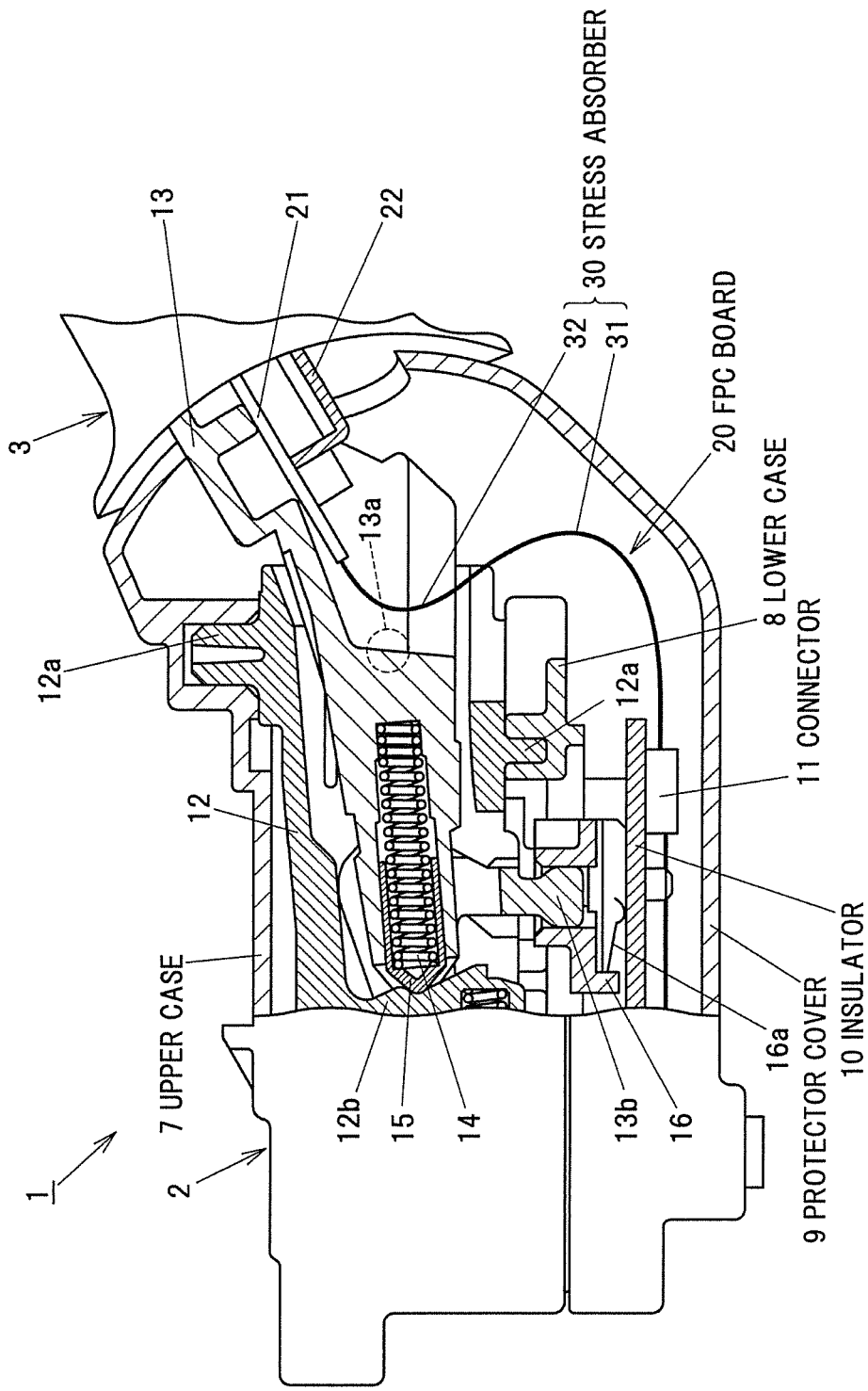
FIG. 2 is an explanatory schematic cross sectional view showing the inside of a main portion of the switch device in the embodiment.

FIGS. 1 and 2 schematically show a typical switch device in the present embodiment which is indicated generally by the reference numeral 1.

A switch device 1 is provided with a unit case 2 as a switch main body to be supported on, e.g., a side of a vehicle steering column, and a cylindrical movable lever-portion 3 supported on the unit case 2 so as to be multi-directionally swingable back and forth and up and down. The movable lever-portion 3 is configured as a combination lever switch composed of a fog switch knob 4, a fixed knob 5 and a light switch knob 6 which are arranged coaxially.

A first contact unit (not shown) is incorporated in the movable lever-portion 3 so that the fixed contact and the moving contact are connected or disconnected by rotational operation of the fog switch knob 4 or the light switch knob 6.

The fog switch knob 4 is configured to be rotatable, relative to the fixed knob 5, between the ON position to turn on fog lamps and the OFF position to turn off the fog lamps. The light switch knob 6 is configured to be rotatable, relative to the fixed knob 5, between the OFF position to turn off tail lights and headlights, the tail position to turn on the tail lights and the head portion to turn on the headlights.

The unit case 2 is provided with an upper case 7 and a lower case 8 which support the movable lever-portion 3, and a protector cover 9 covering a space under the lower case 8. A second contact unit, which is provided with an insulator 10 having a fixed contact (not shown) and a connector 11 having a connector terminal connected to the fixed contact of the insulator 10, is arranged in a space below an opening formed at the middle portion of the lower case 8.

A cylindrical bracket 12 is supported on the upper case 7 and the lower case 8 via vertical supports 12a so as to be swingable back and forth. A cylinder portion of an operating lever 13 is supported inside a cylinder portion of the bracket 12 via a horizontal support 13a so as to be swingable up and down. The operating lever 13 is coupled and fixed to the movable lever-portion 3.

Inside the cylinder portion of the operating lever 13, a lever operating member 15 is retractably supported via a compression coil spring 14. The lever operating member 15 is positioned by a detent portion 12b which is formed on an inner surface of the bracket 12 and has a detent surface with peak and recess.

An operating piece 13b is provided on an outer surface of the cylinder portion of the operating lever 13 so as to extend through the opening of the lower case 8 toward the insulator 10, and the tip portion of the operating piece 13b is fitted to a movable holder 16 to which a moveable terminal 16a is attached.

The operating piece 13b moves in accordance with an operation performed on the movable lever-portion 3. The movable holder 16 follows the movement of the operating piece 13b and moves in the same direction. Passing and dimmer, etc., are switched by connecting/disconnecting the moveable terminal 16a of the movable holder 16 to/from the fixed contact of the insulator 10.

In the switch device 1, a rigid substrate 21 attached to a flexible printed circuit board 20 (hereinafter, referred to as "FPC board 20") at an end on the movable lever-portion 3 side is fixed to an inner surface of the operating lever 13 by a FPC cover 22, as shown in FIGS. 2 and 3. The FPC board 20 is routed in an S-shape from the inside of the movable lever-portion 3 to the inside of the unit case 2.

The FPC board 20 is formed of a long stripe-shaped insulating film having flexibility and has a wiring pattern formed of a silver foil on one surface of the insulating film. On the FPC board 20, the wiring pattern is connected to a fixed contact (not shown) formed at an end portion on the movable lever-portion 3 side and to a fixed contact 23 formed at another end portion on the unit case 2 side.

The fixed contact of the FPC board 20 on the movable lever-portion 3 side is connected to a moving contact of the movable lever-portion 3, and the first contact unit is thereby formed. The fixed contact 23 of the FPC board 20 on the unit case 2 side is connected to the connector 11 which is further connected to the fixed contact of the insulator 10, and the second contact unit is thereby formed. Swinging operation of the movable lever-portion 3 in forward, backward, upward and downward directions electrically connects or disconnects between the first and second contact units.

Configuration of Stress Absorber of FPC Board

In the meantime, the switch device 1 described above is configured that the FPC board 20 is routed from the inside of the movable lever-portion 3 to the inside of the unit case 2. Therefore, when the movable lever-portion 3 is multi-directionally swung back and forth and up and down, torsional stress repeatedly acts on the FPC board 20.

Without absorbing the torsional stress applied to the FPC board 20 due to the characteristic up-and-down or back-and-forth movement of the movable lever-portion 3, it is difficult to ensure high durability of the FPC board 20 to withstand long-term use, or to maintain stable electrical connection of the FPC board 20.

Therefore, the main feature of the switch device 1 in the present embodiment is a configuration of a stress absorber 30 which absorbs the torsional stress applied to the FPC board 20 due to the characteristic up-and-down or back-and-forth movement of the movable lever-portion 3.

The stress absorber 30 is formed on a routed portion of the FPC board 20 to be routed in an internal space of the unit case 2 so that a convex curved portion(s) 31 protruding toward the movable lever-portion 3 and a convex curved portion(s) 32 protruding toward the connector 11 are alternately formed along a longitudinal direction.

To form the stress absorber 30, preferably, the routed portion of the FPC board 20 is curved in opposite directions at positions receiving torsional stress so that torsional stress on the FPC board 20 from the movable lever-portion 3 is effectively absorbed by the routed portion of the FPC board 20.

The stress absorber 30 in the illustrated example is formed to have an S-shaped structure in which the routed portion of the FPC board 20 is curved into a substantially S-shape in the longitudinal direction, as shown in FIGS. 2 to 4A.

Figure 4A:
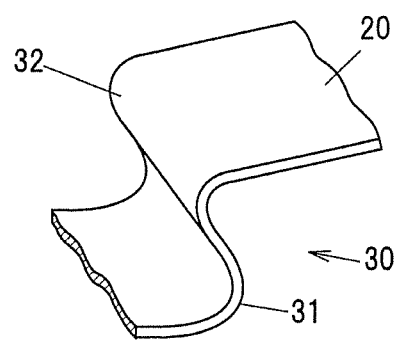
FIG. 4A is a schematic view showing a main portion of the flexible printed circuit board used in the switch device in the embodiment to explain the shape when installed.
Figure 4B:
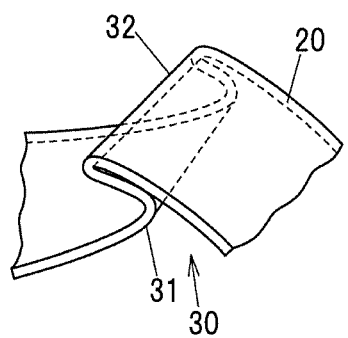
FIG. 4B is a schematic view showing the main portion of the flexible printed circuit board to explain an example of the shape when deformed.

The S-shaped structure of the stress absorber 30 deforms due to bend in a direction crossing the longitudinal direction of the FPC board 20 as shown in FIG. 4B at the time of operation of the movable lever-portion 3, especially, turn operation or dimmer operation. The deformation of the S-shaped structure absorbs the torsional stress applied to the FPC board 20 when operating the movable lever-portion 3.

The number of folds of the stress absorber 30 is not limited to that shown in the illustrated example and is appropriately designed depending on, e.g., the swinging amount of the movable lever-portion 3, etc.

Effects of the Embodiment

The switch device 1 configured as described above exerts the following effects, in addition to the effects described above.

Even when the movable lever-portion 3 is multi-directionally swung back and forth and up and down, torsional stress applied to the FPC board 20 is absorbed by the stress absorber 30 formed on the FPC board 2. Therefore, it is possible to guarantee long-term use of the FPC board 20.

Forming the stress absorber 30 on the FPC board 2 eliminates the necessity of providing an internal space in the unit case 2 to arrange a special member for absorbing stress on the FPC board 20, allowing thinning and weight reduction, etc., of the switch device 1.

Since it is not necessary to provide an internal space in the unit case 2 to arrange a member for absorbing stress on the FPC board 20, the layout of components arranged in the unit case 2 is not limited.

Since the stress absorber 30 is formed on the FPC board 20, it is possible to effectively use a narrow space in the unit case 2.

By using the stress absorber 30 of the FPC board 2, stress such as torsion, etc., applied to the FPC board 20 due to the characteristic up-and-down or back-and-forth movement of the movable lever-portion 3 can be absorbed, regardless of length, width or the routed state of the FPC board 20.

Although a combination lever switch provided with light switches to turn on/off headlamps or fog lamps of vehicle has been described in the embodiment and the illustrated example, it is not limited thereto. The invention is applicable to a combination lever switch for another intended use and provided with, e.g., a wiper switch to operate windshield wipers, or a switch device provided with various operating levers.

In addition, although the switch device 1 is applied to a car in the embodiment and illustrated example, it is not limited thereto. It is obvious that the invention can be effectively applied to, e.g., various vehicles such as construction machineries and agricultural machineries.

Although the typical embodiment and illustrated example of the invention have been described, it is obvious from the above description that the invention according to claims is not to be limited to the embodiment and illustrated example. Therefore, it should be noted that all combinations of the features described in the embodiment and illustrated example are not necessary to solve the problem of the invention.

What is claimed is:

1. A switch device, comprising: a cylindrical movable lever-portion that is operable in multiple directions; a unit case that supports the movable lever-portion through a curved part thereof, the curved part being curved along a central axis of the movable lever-portion; and a flexible printed circuit board routed from an inside of the movable lever-portion to an inside of the unit case, wherein a routed portion of the flexible printed circuit board to be routed inside the unit case comprises a stress absorber configured to absorb a stress applied to the flexible printed circuit board, and wherein the stress absorber is disposed along the curved part and comprises a plurality of curved portions curved in opposite directions to each other in such a way that the stress absorber deforms due to the curved portions bending toward one another in a direction crossing the longitudinal direction of the flexible printed circuit board without changing a length thereof at the time of operation of the movable lever-portion.

2. The switch device according to claim 1, wherein the curved portions comprise a part folded into a substantially S-shape.

3. The switch device according to claim 1, wherein the flexible printed circuit board comprises a flexible insulating film and a wiring pattern formed on the insulating film.

4. The switch device according to claim 3, wherein the flexible printed circuit board further comprises a rigid board attached thereto at one end thereof on a side of the movable lever-portion.

5. A switch device, comprising:
a cylindrical lever-portion that is operable in multiple directions;
a unit case that movably supports the lever-portion through a curved part thereof such that the lever-portion is movable in multiple directions relative to the unit case, the curved part being curved along a central axis of the movable lever-portion; and
a flexible printed circuit board routed from an inside of the movable lever-portion to an inside of the unit case,
wherein a routed portion of the flexible printed circuit board to be routed inside the unit case comprises a stress absorber configured to absorb a stress applied to the flexible printed circuit board, and
wherein the stress absorber is disposed along the curved part of the unit case and comprises a plurality of curved portions curved in opposite directions to each other in such a way that the stress absorber deforms due to the curved portions bending toward one another in a direction crossing the longitudinal direction of the flexible printed circuit board without changing a length thereof at the time of operation when the lever-portion is moved in one or more of the multiple directions relative to the unit case.

* * * * *